United States Patent
Carman

(10) Patent No.: US 8,002,552 B2
(45) Date of Patent: Aug. 23, 2011

(54) METHOD AND APPARATUS FOR TOILET TRAINING

(76) Inventor: Jill M. Carman, West Long Branch, NJ (US)

( * ) Notice: Subject to any disclaimer, the term of this patent is extended or adjusted under 35 U.S.C. 154(b) by 734 days.

(21) Appl. No.: 12/011,738

(22) Filed: Jan. 29, 2008

(65) Prior Publication Data

US 2009/0191530 A1    Jul. 30, 2009

(51) Int. Cl.
*G09B 9/00* (2006.01)
(52) U.S. Cl. ....................................................... 434/247
(58) Field of Classification Search .................. 434/126, 434/236, 247, 365; 40/406, 407; 446/153, 446/267, 483; 472/65
See application file for complete search history.

(56) References Cited

U.S. PATENT DOCUMENTS

| | | | | |
|---|---|---|---|---|
| 3,613,264 A | * | 10/1971 | Vitka | 434/126 |
| 4,221,073 A | * | 9/1980 | Malczewski | 446/267 |
| 5,189,821 A | * | 3/1993 | Lee | 40/406 |
| 5,299,938 A | * | 4/1994 | Waltho | 434/126 |
| 5,301,444 A | * | 4/1994 | Horiuchi | 40/426 |
| 5,435,086 A | * | 7/1995 | Huang | 40/426 |
| 5,706,575 A | * | 1/1998 | Kaufman et al. | 29/609 |
| 6,187,394 B1 | * | 2/2001 | Johnson et al. | 428/13 |
| 6,393,744 B1 | * | 5/2002 | Snyder | 40/406 |
| 6,594,929 B2 | * | 7/2003 | Butcher | 40/406 |
| 6,681,508 B2 | * | 1/2004 | Unger et al. | 40/406 |
| 6,699,092 B1 | * | 3/2004 | Cimerman et al. | 446/153 |
| 2010/0015881 A1 | * | 1/2010 | Bickmore et al. | 446/153 |

* cited by examiner

*Primary Examiner* — Kurt Fernstrom
(74) *Attorney, Agent, or Firm* — Robert M. Skolnik

(57) ABSTRACT

A method and apparatus for toilet training for children or as an aid to urinary function for adults which presents two cues to the person. The first cue is an audible sound of water flowing. The second cue is visual observation of water flowing. The cues are presented in a structure which may be a rotatable hour glass shaped liquid containing device which permits the liquid to flow from one portion of the hour glass to the other when the device is rotated. A sound of flowing water is produced from sound storage means in the device. The liquid may be refilled or it may be pre-sealed at the factory. Two plates are proved at the ends of the hour glass to house a picture in one and a mirror in the other. The structure may be utilized free-standing, or attached to a rotatable base which, in turn, may be fixedly or removably mounted on a surface.

2 Claims, 1 Drawing Sheet

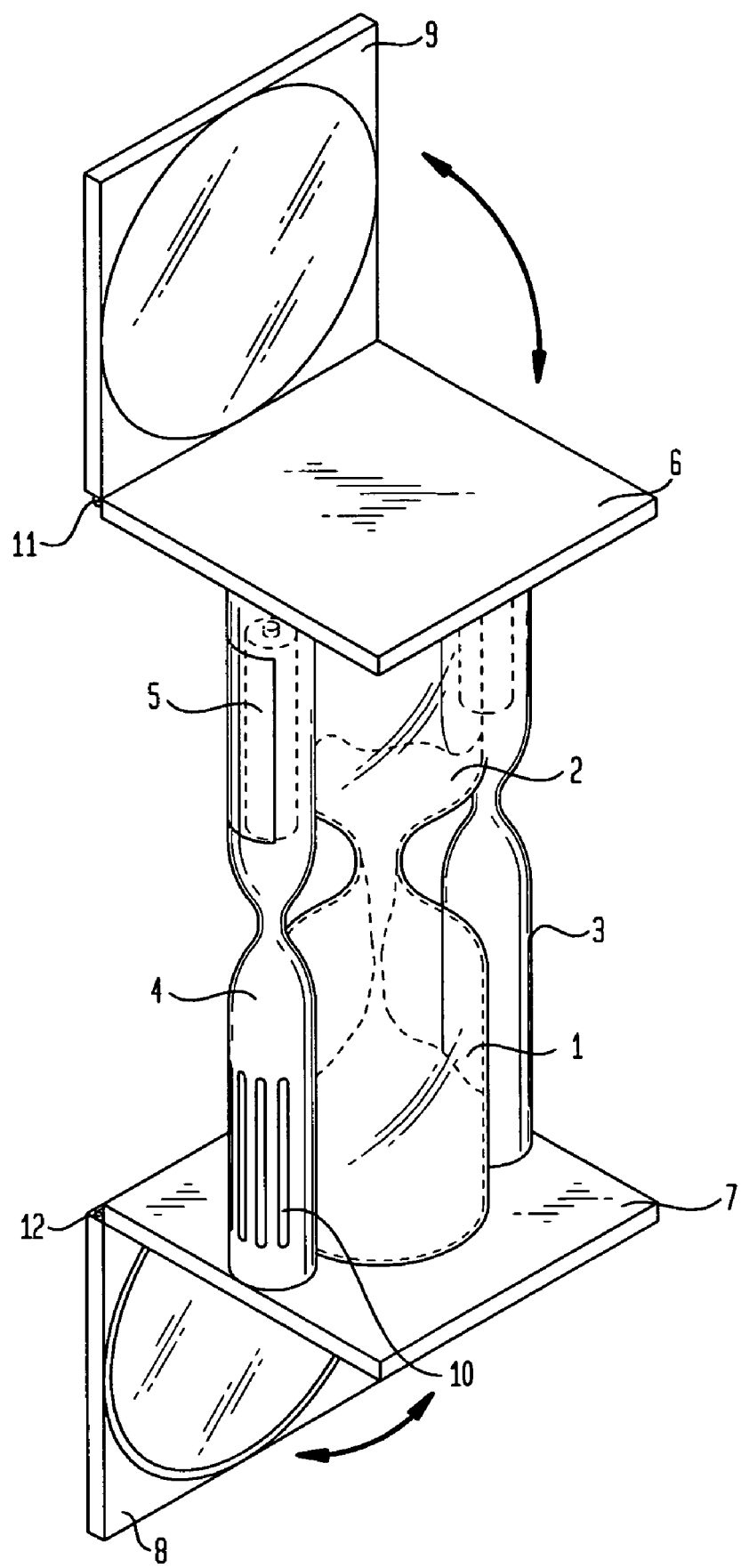

METHOD AND APPARATUS FOR TOILET TRAINING

FIELD OF THE INVENTION

A method and apparatus for toilet training for children or as an aid to urinary function for adults presents two cues to the person. The first cue is an audible sound of liquid flowing. The second cue is a visual observation of liquid flowing.

SUMMARY OF THE INVENTION AND DESCRIPTION OF RELATED ART

The present invention is a method and apparatus for toilet training or an aid to urinary function which presents two cues to the person. The first cue is an audible sound of water flowing. The second cue is visual observation of water flowing. The cues are presented in a structure which may be a rotatable hour glass shaped liquid containing device which permits the liquid to flow from one portion of the hour glass to the other when the device is rotated. A sound of flowing water is produced from sound storage means in the device. The liquid may be refilled or it may be pre-sealed at the factory. Two plates are proved at the ends of the hour glass to house a picture in one and a mirror in the other. The structure may be utilized free-standing, or attached to a rotatable base which, in turn, may be fixedly or removably mounted on a surface.

The prior art is represented by the following:

| | |
|---|---|
| 2,555,107 | Beebe |
| 3,583,093 | Glass, et al. |
| 3,775,901 | Ellman, et al. |
| 4,443,200 | Murphy |
| 5,432,956 | Park |
| 6,038,711 | Clarke |

Beebe is representative of a number of patents which disclosed drinking dolls where water can be inserted into the doll and is removed therefrom in an action suggesting wetting. Glass, et al. is another drinking doll which also has a mechanism for playing pre-recorded messages. Ellman, et al. discloses a drinking doll with a "potty" structure for receiving the discharged liquid. Murphy shows a teddy bear having internal structure which simulates the toilet functions. Park is a toilet seat which incorporates visible decorations in a liquid filled chamber and a sound generator which plays music. Clarke shows a potty trainer where the sound of a toilet flushing is played.

It is a principal object of the invention to provide a method and apparatus for toilet training which provides both visual and audible cues for training.

It is another object of the invention to provide a method and apparatus for toilet training which provides a visible water flow and an audible sound of water flowing.

It is another object of the invention to provide an apparatus of the class described which is free-standing.

A still further object of the invention is the provision of an toilet training device which may be mounted on a rotatable base.

Another object of the invention is the provision of a toilet training apparatus mounted on a rotatable base where the base can be removable attached to a surface bear the potty.

BRIEF DESCRIPTION OF THE DRAWINGS

The FIGURE is a perspective view of the preferred embodiment of my invention.

DETAILED DESCRIPTION OF THE PREFERRED EMBODIMENT

The present invention is a method and apparatus for aiding children or adults in urinating by the sound and the visualization of running water. The preferred embodiment of the invention takes the form of an hour glass shaped container with running water through the restricted neck of the hour glass. plate. This provides the visual cue.

The device has two handles which serve both to support the hour glass and to house a sound system. The sound system plays the sounds of flowing water as the audible cue.

The device has accessory features, namely a mirror on one end which is mounted on a hinge to flip up 90° so that the user can see themselves for amusement and distraction. A picture frame is similarly mounted on the other end to provide a different source of amusement and distraction.

In use, the apparatus can be hand held and rotated or placed on a flat surface such as the floor or a table. It can also be mounted on a rotatable surface which, in turn, may be removably mounted on a wall or other surface with a suction cup, for example. It may also be mounted on a child's potty, which may be housed in a vehicular shaped housing, for example.

The sound generator may be turned on either manually via a switch, or automatically, by the rotation of the device.

With reference to the FIGURE, the visual cue of water flowing is presented in a clear hour glass shaped housing having an upper portion 2 and a lower portion 1 separated by a narrow neck. The hour glass is supported between two rectangular plates 6 and 7. Supports 3 and 4 are also connected to the base plates 6 and 7 and are positioned adjacent to the hour glass. These supports may be hollow in part for mounting electrical batteries 5 therein and electronic circuitry not shown to generate the sound of flowing water. A speaker 10 is also mounted in the support 4. For further amusement, two plates 8 and 9 are attached to plates 7 and 6 at hinges 12 and 11, respectively which plates are used to mount a mirror and/or a picture. The electronics may be turned ON manually by a switch or automatically on rotation of the device.

The preferred embodiment shown in the FIGURE is used by manually rotation. It is to be noted that the device may be attached to a rotatable mounting which, in turn may be affixed to or removably mounted on a surface such as a bathroom wall.

Further modifications to the methods and apparatus of the invention may be made without departing from the spirit and scope of the invention.

I claim:

1. A urinary function training device for adults and children comprising: a rotatable housing having liquid contained therein, said housing being partially formed of a material which permits a person to see said liquid, said housing having a first portion and a second portion said liquid being capable of flowing between said portions when said device is rotated, sound generating means mounted in said housing for generating an audible sound of flowing liquid, first and second supports attached to said housing, and means attached to said supports for displaying a mirror and a photograph thereon.

2. The urinary training device of claim 1 further including at least one elongated connector mounted adjacent said housing between said supports containing said sound generating means.

\* \* \* \* \*